US 6,684,282 B1

(12) United States Patent
Kocis

(10) Patent No.: US 6,684,282 B1
(45) Date of Patent: Jan. 27, 2004

(54) SYSTEM AND METHOD FOR ADDING AN INTERNAL RAID CONTROLLER

(75) Inventor: Thomas J. Kocis, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 547 days.

(21) Appl. No.: 09/770,161

(22) Filed: Jan. 26, 2001

(51) Int. Cl.[7] .................. G06F 13/00; G06F 13/14; G06F 12/00
(52) U.S. Cl. .................. 710/300; 710/305; 711/114
(58) Field of Search .................. 710/300, 305, 710/311; 711/114; 714/6, 43, 48; 361/684, 685

(56) References Cited

U.S. PATENT DOCUMENTS

| | | | | |
|---|---|---|---|---|
| 5,224,019 A | * | 6/1993 | Wong et al. | 361/685 |
| 5,479,653 A | | 12/1995 | Jones | 395/182.03 |
| 5,506,977 A | | 4/1996 | Jones | 395/482 |
| 5,511,227 A | | 4/1996 | Jones | 395/829 |
| 5,530,960 A | | 6/1996 | Parks et al. | 395/825 |
| 5,548,783 A | | 8/1996 | Jones et al. | 395/836 |
| 5,652,695 A | | 7/1997 | Schmitt | 361/685 |
| 5,694,615 A | | 12/1997 | Thapar et al. | 395/822 |
| 5,751,715 A | | 5/1998 | Chan et al. | 370/455 |
| 5,812,754 A | | 9/1998 | Lui et al. | 395/182.04 |
| 5,822,184 A | | 10/1998 | Rabinovitz | 361/685 |
| 5,841,997 A | | 11/1998 | Bleiweiss et al. | 395/311 |
| 5,898,828 A | * | 4/1999 | Pignolet et al. | 714/6 |
| 5,931,958 A | * | 8/1999 | Bouvier et al. | 714/48 |
| 5,973,919 A | | 10/1999 | Larabell | 361/684 |
| 5,991,891 A | | 11/1999 | Hahn et al. | 714/4 |
| 6,018,456 A | * | 1/2000 | Young et al. | 361/684 |
| 6,061,752 A | | 5/2000 | Jones et al. | 710/103 |
| 6,065,096 A | | 5/2000 | Day et al. | 711/114 |
| 6,076,142 A | | 6/2000 | Corrington et al. | 711/114 |
| 6,098,140 A | * | 8/2000 | Pecone et al. | 710/311 |
| 6,460,149 B1 | * | 10/2002 | Rowlands et al. | 714/43 |
| 6,502,156 B1 | * | 12/2002 | Sacker et al. | 710/305 |
| 6,526,477 B1 | * | 2/2003 | Yuan et al. | 711/114 |

FOREIGN PATENT DOCUMENTS

JP 2000-025521 * 11/2000 ........... G11B/33/02

OTHER PUBLICATIONS

Drawings filed in U.S. Pending patent application Ser. No. 09/712,048 entitled "Swing–Out Hard Drive Apparatus" filed by Greenfield et al. and assigned to Dell Products L.P. (DC–02583), filed Nov. 14, 2000.
U.S. Pending patent application Ser. No. 09/353,938 entitled "Modular Bay Enclosure Removable Card Method and System" filed by Jaggers et al and assigned to Dell USA L.P. (DC–01975), filed Jul. 15, 1999.
U.S. Pending patent application Ser. No. 09/712,048 entitled "Swing–Out Hard Drive Apparatus" filed by Greenfield et al. and assigned to Dell Products L.P. (DC–02583), filed Nov. 14, 2000.

* cited by examiner

Primary Examiner—Glenn A. Auve
Assistant Examiner—Christopher E. Lee
(74) Attorney, Agent, or Firm—Baker Botts L.L.P.

(57) ABSTRACT

A system and method are provided for adding an internal RAID controller. The system and method includes a plurality of hard disk drives storing data. Hard disk drive bays receive the hard disk drives. A modified hard disk drive bay accepts a RAID controller. The user inserts the RAID controller into the modified hard disk drive bay allowing data transfer between the hard disk drives, the RAID controller, and the motherboard of the computer on two interface loops. One interface loop, the control loop, provides an interface between the loop controller on the motherboard and the RAID controller. The other interface loop, the storage loop, provides an interface between the RAID controller, the hard disk drives, and any external hard disk drives. The RAID controller communicates with the motherboard allowing RAID functionality among the hard disk drives.

24 Claims, 3 Drawing Sheets

SYSTEM AND METHOD FOR ADDING AN INTERNAL RAID CONTROLLER

TECHNICAL FIELD

This disclosure relates in general to the field of information storage, and more particularly to a system and method for adding an internal RAID controller to a computer system.

BACKGROUND

RAID (redundant array of independent disks) storage technology allows for the storing of the same data on multiple hard disks. Redundantly storing the data on multiple hard disks allows for increased performance and fault tolerance which is the ability of a RAID array to withstand the loss of some of its hardware without the loss of data and without the loss of availability. The increased performance results from the input/output operations overlapping in a parallel manner. Storing data redundantly across multiple disks results in increased fault tolerance for RAID storage. There are at least nine types of RAID as well as a non-redundant RAID types all using disk striping and/or disk mirroring to increase performance and fault tolerance.

The RAID array appears to the operating system as a single hard disk or a LUN (logical unit number). In order to appear as a single hard disk and have the RAID functions occur within the multiple hard disks, the RAID array requires a RAID controller. The RAID controller determines what level of RAID a system supports and uses as well as allows the multiple hard disks to function and appear as a single hard disk or LUN to the operating system.

There are different ways to implement a RAID controller. Software based RAID controllers control the RAID array using software applications running on the system's central processing unit (CPU) rather than specialized hardware and are typically found in entry level servers. Another implementation of a RAID controller is a RAID controller embedded on a system's motherboard (RAID on motherboard or ROMB). Another implementation of a RAID controller is a PCI RAID controller where a RAID controller is on a PCI adapter card and plugged into a PCI expansion slot of a computer system. A final implementation of a RAID controller is an external RAID controller where a RAID controller and additional hard disks are in an enclosure separate from the main computer system.

One limitation associated with implementing a RAID controller is that with software based RAID controllers, the RAID controller puts a demand on a system's CPU. This demand on the CPU can adversely affect the performance of software applications running on the system. Software based RAID controllers do provide cost advantages but demands on the CPU often outweigh the cost advantages.

Another limitation in implementing a RAID controller is that with ROMB, the RAID controller is limited to the space constraints of the motherboard. Therefore, ROMB offers only a fraction of the RAID performance offered by other types of RAID controllers. In addition, adding the RAID controller to the motherboard adds a fixed cost to the cost of the motherboard that not all users are willing to accept. Some users may not require a RAID controller but have to pay for one because the RAID controller is already installed on the motherboard and the cost of the RAID controller is already added into the cost of the motherboard.

Another limitation in implementing a RAID controller is that with a PCI card based RAID controller, a user uses up one of the system's PCI expansion slots for the RAID controller. Users prefer to have as many PCI expansion slots as possible and get upset when required to use up an expansion slot for something like a RAID controller which they believe should not require the use of an expansion slot. In addition, the trend in computers is to make everything smaller meaning sacrificing options such as the number of PCI expansion slots. Therefore, if a user already has a less than desirable number of expansion slots, using one of those expansion slots for a RAID controller is not generally an acceptable option.

Another limitation in implementing a RAID controller is that an external RAID controller is expensive and requires the computer system to be in more than one box and therefore occupy more floor space. In addition, an external RAID controller cannot control any of the internal hard disks of the computer system. Therefore any data saved on the internal hard disks will not be able to take advantage of any of the RAID features such as increased performance and fault tolerance.

SUMMARY

Therefore, a need has arisen for a system and method for adding a RAID controller that does not place a demand on the computer system's CPU.

A further need has arisen for a system and method for adding a RAID controller that does not add a fixed cost to the cost of a motherboard.

A further need has arisen for a system and method that allows for adding a RAID controller without occupying a bus expansion slot.

A further need has arisen for a system and method that allows a RAID controller to control both internal and external hard disks.

In accordance with teachings of the present disclosure, a system and method are described for adding an internal RAID controller which substantially eliminates or reduces disadvantages and problems associated with previous systems and methods. The system and method allows for a user to add a RAID controller in an internal hard disk drive bay. The motherboard communicates with the RAID controller on one loop while the RAID controller communicates with the hard disk drives on a second loop.

In accordance with one aspect of the present disclosure, a system and method provides a user the ability to add an internal RAID controller to a computer. A computer has a plurality of hard disk drives that store data. The hard disk drives connect to the computer through hard disk drive bays. A modified hard disk drive bay accepts either a RAID controller or a hard disk drive. A user inserts the RAID controller into the modified hard disk drive bay. Data flows between the hard disk drives, the RAID controller, and the motherboard of the computer on two interface loops controlled by the loop controller. One of the interface loops, the control loop, provides an interface between the RAID controller and the loop controller on the motherboard. The other interface loop, the storage loop, provides an interface between the RAID controller, the internal hard disk drive bays, and any external hard disk drives. Therefore, the RAID controller communicates with the motherboard and the hard disk drives appear as one or more LUNs managed by RAID functionality.

More specifically, a computer uses fibre channel to allow for two communications: one communication between the motherboard and the RAID controller and a second communication between the RAID controller and the hard disk drives. The dual loop definition of the standard fibre channel hard disk drive connector provides an opportunity for the placement of a RAID controller in a hard disk drive bay. Reconfiguring the usage of the pin connectors on the hard disk drive bay allows for the hard disk drive bay to accommodate a RAID controller. With a RAID controller installed in a hard disk drive bay, two independent loops are formed: a control loop and a storage loop. The control loop provides communication between the motherboard and the RAID controller. The storage loop provides communication between the RAID controller and internal and external hard disk drives.

The present disclosure provides a number of important technical advantages. One important technical advantage is that the system and method provides for an internal RAID controller without placing any demands on the computer's CPU. Unlike software based RAID controllers which often offer limited RAID levels and burden the system's CPU by utilizing CPU cycles, a RAID controller in a hard disk drive bay allows for the operation of the desired number of RAID levels and does not place demands on the computer's CPU and does not reduce the processing power available to application programs.

Another important technical advantage of the present disclosure is that the system and method provides for an internal RAID controller without adding a fixed cost to the cost of the motherboard. Users can determine whether or not they want to install a RAID controller in the hard disk drive bay. Therefore, a user does not have to pay for a RAID controller unless the user wants the RAID controller. Since the RAID controller is not embedded on the motherboard, the cost of the motherboard does not increase. In addition, the RAID controller does not burden the motherboard and there is room on the motherboard for other controllers desired by the users.

Another important technical advantage of the present disclosure is that the system and method provides for an internal RAID controller without using a PCI expansion slot. Because the RAID controller installs into a hard disk drive bay, a user does not have to use a PCI expansion slot for the RAID controller. Users like having the ability to expand their computers capabilities with expansion cards in PCI expansion slots and are therefore more satisfied with their computers when they feel that the PCI expansion slots are not unnecessarily occupied.

Another important technical advantage of the present disclosure is that the system and method allows for an internal RAID controller which is less expensive than an external RAID controller. In addition, an internal RAID controller can control both internal and external hard disk drives. Having an internal RAID controller saves the user money because the user only needs one RAID controller as opposed to two RAID controllers in order to control the internal and external hard disk drives. Also, an internal RAID controller allows the user, instead of the RAID configuration, to decide how to store data. For example, the user no longer has to store the operating system and applications files on the internal hard disk drives and all of the data on the external hard disk drives to allow the external RAID controller to control the data. Since the internal RAID controller controls all the hard disk drives, the user can spread the operating system, applications, and data among all of the hard disk drives. In addition, the user does not have to bother with the extra space occupied by an external RAID controller and finding a location to place it.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

Figure 1:
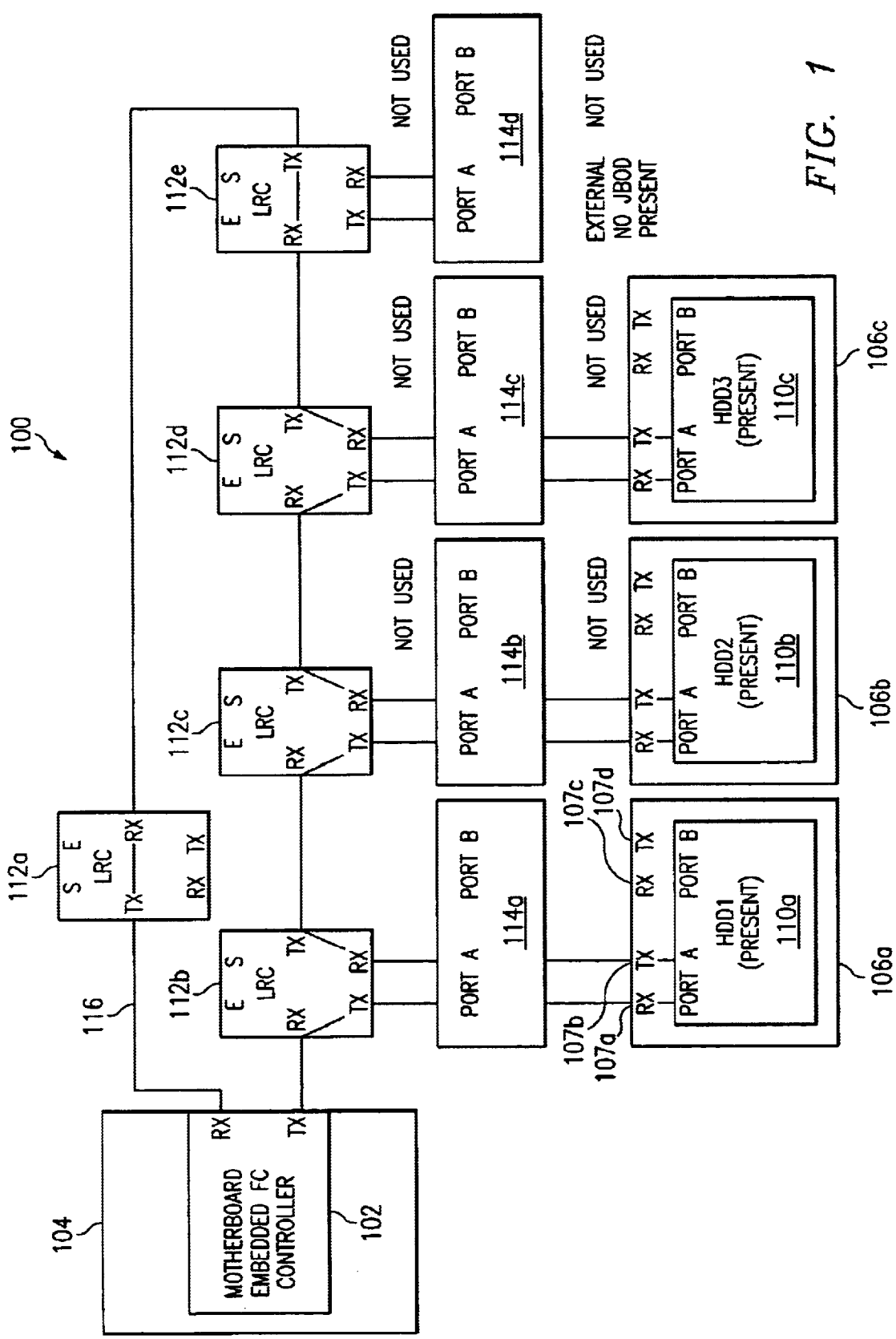
FIG. 1 depicts a block diagram for a hardware components configuration having a modified hard disk drive bay capable of accepting a RAID controller or a hard disk drive.

FIG. 1 depicts a block diagram for the hardware components configuration having a modified hard disk drive bay capable of accepting a RAID controller or a hard disk drive. System 100 is shown in FIG. 1 with hard disk drive 110a installed in modified hard disk drive bay 106a. System 100 is completely contained within a personal computer or server. System 100 is shown using fibre channel as the interface interconnect loop. Other interface interconnect loops, such as parallel SCSI, Infiniband, Ethernet, ATA, or USB will also function in System 100.

Loop controller 102, embedded in motherboard 104 of system 100, controls the transfer of data within system 100. System 100 also contains three hard disk drive bays 106a, 106b, and 106c. The present embodiment contains three hard disk drive bays 106 but in alternative embodiments system 100 may contain more than three or less than three hard disk drive bays. Modified hard disk drive bay 106a accepts either a hard disk drive or a RAID controller. Modified hard disk drive bay 106a is modified to accept a hard disk drive or a RAID controller by redefining pin connectors 107. As shown in FIG. 1, modified hard disk drive bay 106a contains hard disk drive 110a while hard disk drive bay 106b contains hard disk drive 106b and hard disk drive bay 106c contains hard disk drive 110c. Fiber channel hard disk drives are identical to SCSI drives, except for their interfaces. Fiber channel hard disk drives provide dual ports to support redundant loop configurations.

As stated above, system 100 is shown using fibre channel as the interface interconnect loop. Using fibre channel as the interface interconnect loop requires the use of link resiliency circuits (LRC) 112 which are ordinarily used to complete the loop when a device is not connected to a port. LRCs 112 connect to the devices within hard disk drive bays 106 through node ports 114. LRC 112 senses if a device is attached to node port 114. If a device is attached to a node port 114, then an LRC 112 switches to allow the device into the fibre channel interface interconnect loop. For example, no device is attached to node port 114d. Therefore, LRC 112e recognizes that no device is attached and allows data to pass through it without going down to node port 114d.

Hard disk drive bays 106 and node ports 114 have two sets of ports to allow for the dual loop capability of standard fibre channel hard disk drives. In typical fibre channel arbitrated loop systems, fibre channel networks are configured with two loops where the second loop provides redundancy in the event of a failure of the first loop. In addition, the transfer of data on the fibre channel loops is half duplex in that it is only in one direction. Many fibre channel networks are implemented with copper cable to reduce costs, but can include fibre optic cable if required by the distances between node ports 114. LRCs 112 simplify wiring and provide bypass circuits that allow devices and node ports 114 to be added or removed with minimal disruption to the loop.

System 100 contains one loop when hard disk drive 110a is installed in modified hard disk drive bay 106a or when modified hard disk drive bay 106a is empty. With hard disk drive 110a installed in modified hard disk drive bay 106a, loop 116 is the operable loop. Loop 116 leaves loop controller 102, passes through LRC 112b, port A of node port 114a, and through pin connector 107a to access hard disk drive 110a. Loop 116 leaves hard disk drive 110a through pin connector 107b, passes back through port A of node port 114a and LRC 112b to LRC 112c. At LRC 112c, loop 116 accesses hard disk drive 110b. Loop 116 continues on from hard disk drive 110b to LRC 112d to access hard disk drive 110c. Loop 116 then bypasses LRC 112e and LRC 112a because no external devices are attached and returns to loop controller 102.

With no RAID controller installed in system 100, loop controller 102 controls the operation of hard disk drives 110 and there is no hardware RAID functionality. LRC 112a allows for the addition of a RAID controller into modified hard disk drive bay 106a but is not utilized when hard disk drive 110a is installed in modified hard disk drive bay 106a. A system with a RAID controller installed in modified hard disk drive bay 106a is described in FIG. 2 below.

Figure 2:
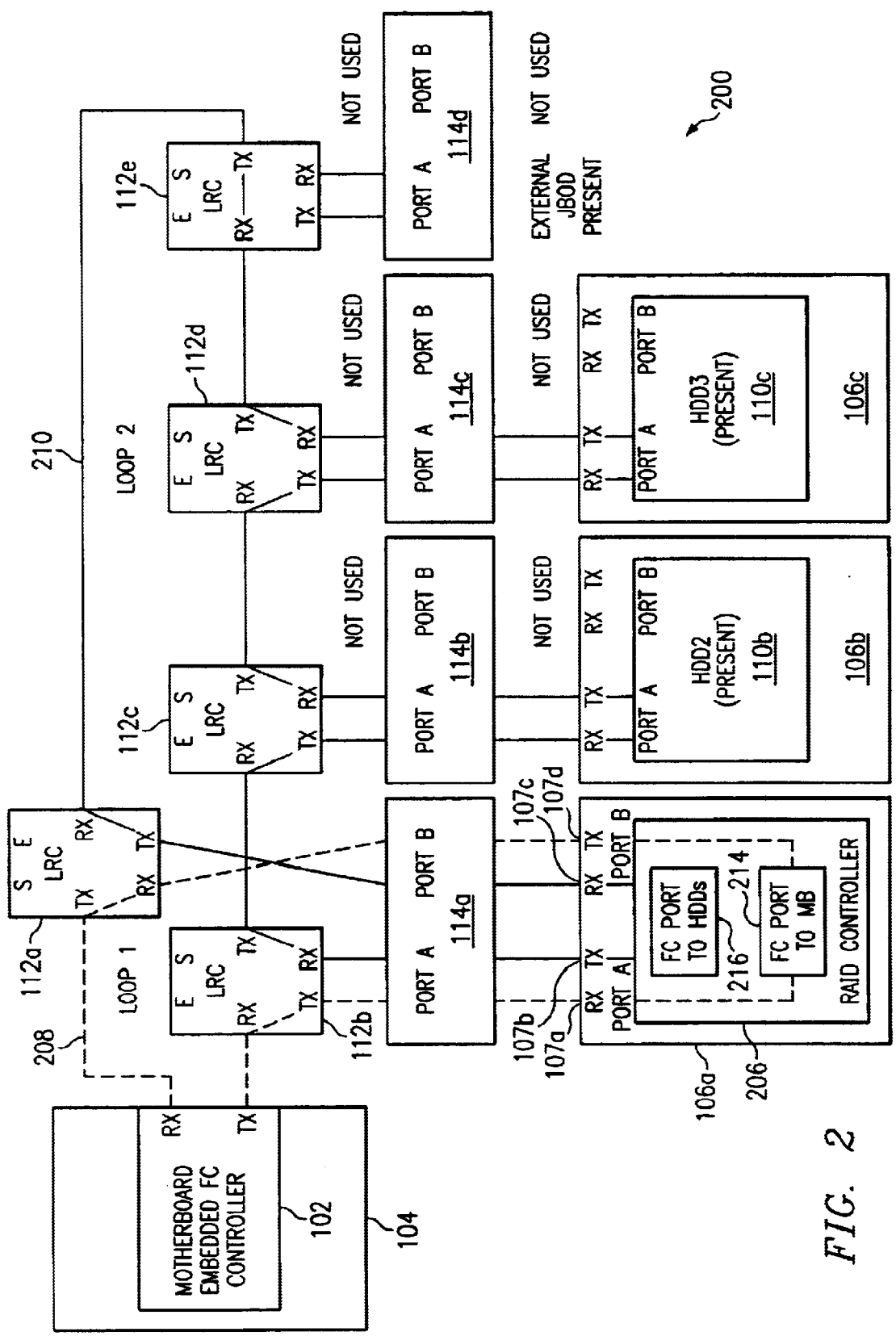
FIG. 2 illustrates a block diagram for the hardware components configuration for an internal RAID controller system.

FIG. 2 illustrates a block diagram for the hardware components configuration for an internal RAID controller system 200. System 200 is completely contained within a personal computer or server. System 200 is shown with fibre channel as the interface interconnect loop while alternative embodiments may employ parallel SCSI, Infiniband, Ethernet, ATA, or USB as the interface interconnect loop.

As in system 100, hard disk drive bay 106b contains hard disk drive 110b and hard disk bay 106c contains hard disk drive 110c. Unlike system 100, modified hard disk drive bay 106a accepts RAID controller 206.

By redefining the usage of the pin connectors 107 on the standard fibre channel hard disk drive, two loops are created when RAID controller 206 is present: control loop 208 and storage loop 210.

Control loop 208 provides an interface between loop controller 102 and RAID controller 206. Control loop 208 leaves loop controller 102, passes through LRC 112b, through port A of node port 114a and to RAID controller 206 through pin connector 107a. Control loop 208 accesses fibre channel port 214 of RAID controller 206 and exits RAID controller 206 through pin connector 107d. Exiting through pin connector 107d, control loop 208 passes through port B of node port 114a, through LRC 112a, and back to loop controller 102. Control loop 208 allows motherboard 104 through loop controller 102 to communicate with RAID controller 206. With the insertion of RAID controller 206 into modified hard disk drive bay 106a, control of hard disk drives 110 switches from loop controller 102 to RAID controller 206. By having motherboard 104 through loop controller 102 communicate with RAID controller 206, control loop 208 allows for RAID sets to appear as LUNs to motherboard 104.

Storage loop 210 allows RAID controller 206 to communicate with hard disk drives 110 as well as any external devices connected to system 200 through node port 114d. Storage loop 210 has no direct contact with loop controller 102. Storage loop 210 originates at hard disk drive fibre channel port 216 and exits RAID controller 206 through pin connector 107b. Storage loop 210 passes through port A of node port 114a, LRC 112b, and then accesses LRC 112c. At LRC 112c, storage loop 210 accesses hard disk drive 110b through port A of node port 114b. After accessing hard disk drive 110b, storage loop 210 continues to LRC 112d and accesses hard disk drive 110c through port A of node port 114c. Through LRC 112e, storage loop 210 accesses any external hard disk drives attached to system 200 in a just a bunch of disks (JBOD) enclosure. Storage loop 210 then passes through LRC 112a and port B of node port 114a and returns to RAID controller 206 through pin connector 107c. Storage loop 210 allows RAID controller 206 to communicate with all storage devices attached to storage loop 210 and therefore apply RAID storage functionality.

Control loop 208 allows motherboard 104 to communicate with RAID controller 206 and allows for RAID storage characteristics. Storage loop 210 allows for RAID controller 206 to communicate with internal hard disk drives 110 as well as any external hard disk drives and create a RAID storage array. Having RAID controller 206 installed in the internal modified hard disk drive bay 106a allows RAID controller 206 to control not only the internal hard disk drives 110, but also any external hard disk drives attached to system 200 through node port 114d. Therefore, RAID controller 206 communicates with and applies RAID techniques to hard disk drives 110 using storage loop 210 and motherboard 104 communicates with RAID controller 206 using control loop 208.

Figure 3:
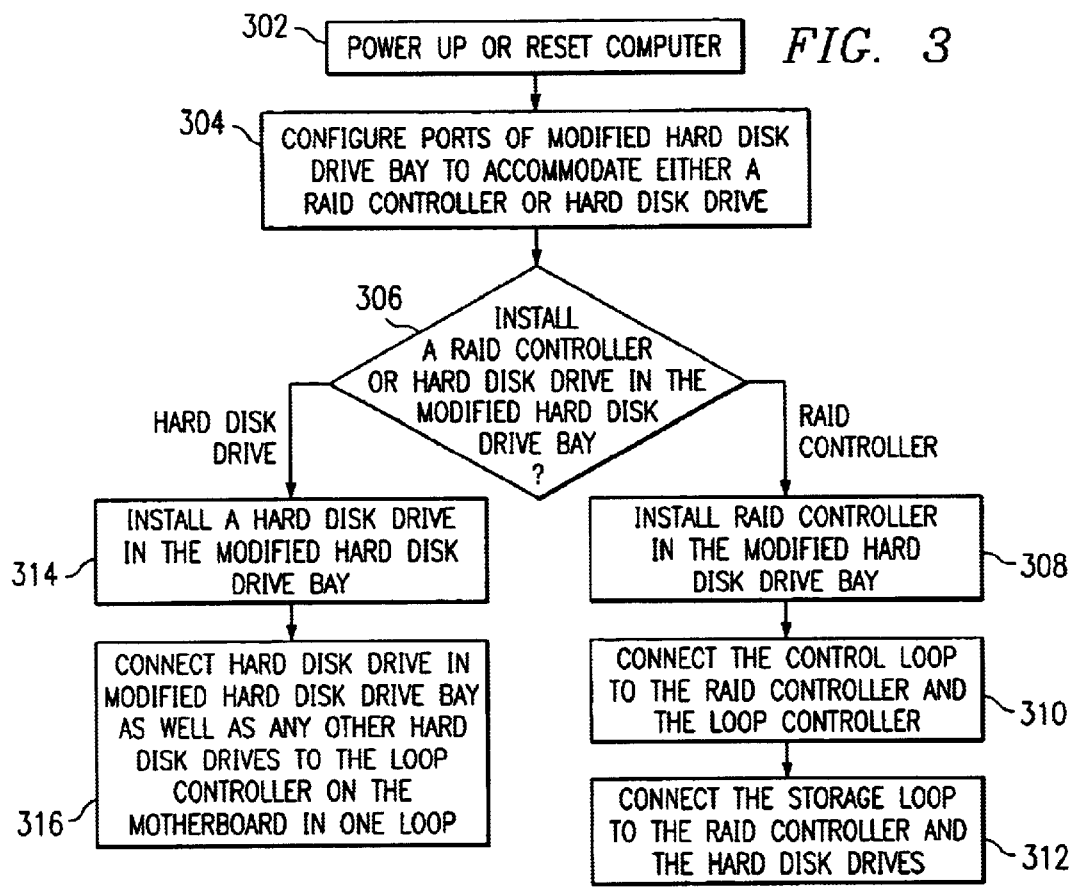
FIG. 3 illustrates a flow diagram for adding either an internal RAID controller or a hard disk drive in the modified hard disk drive bay.

FIG. 3 illustrates a flow diagram for adding either an internal RAID controller or a hard disk drive in the modified hard disk drive bay 106a. In step 302, a user powers up or resets the computer system. Then in step 304, the user configures pin connectors 107 and port 114a associated with modified hard disk drive bay 106a to allow modified hard disk drive bay 106a to accept either RAID controller 206 or hard disk drive 110a. At step 306, the user must decide whether to install RAID controller 206 or hard disk drive 110a in modified hard disk drive bay 106a.

If the user wants to install RAID controller 206 in modified hard disk drive bay 106a, then in step 308 the user installs RAID controller 206 into modified hard disk drive bay 106a. Taking advantage of modified pin connectors 107 and node port 114a, in step 310 the user connects RAID controller 206 to loop controller 102 and motherboard 104. This connection in step 310 creates control loop 208. Then in step 312, the user connects in a loop RAID controller 206 and hard disk drives 110b and 110c as well as any external hard disk drives to create storage loop 210.

If the user desires to install hard disk drive 110a in modified hard disk drive bay 106a in step 306, then in step 314 the user installs hard disk drive 110a in modified hard disk drive bay 106a. Using one loop, the user then connects hard disk drives 110 with loop controller 102 and motherboard 104 to create loop 116 in step 316 whereby loop controller 102 controls hard disk drives 110.

Although the process described in FIG. 3 deals with a user determining what type of device to install in modified hard disk drive bay 106a, the process in FIG. 3 also applies to the manufacturer of a computer system when the manufacturer is building the computer system and determining what type of device to install in modified hard disk drive bay 106a before sending the computer system to the customer.

Figure 4:
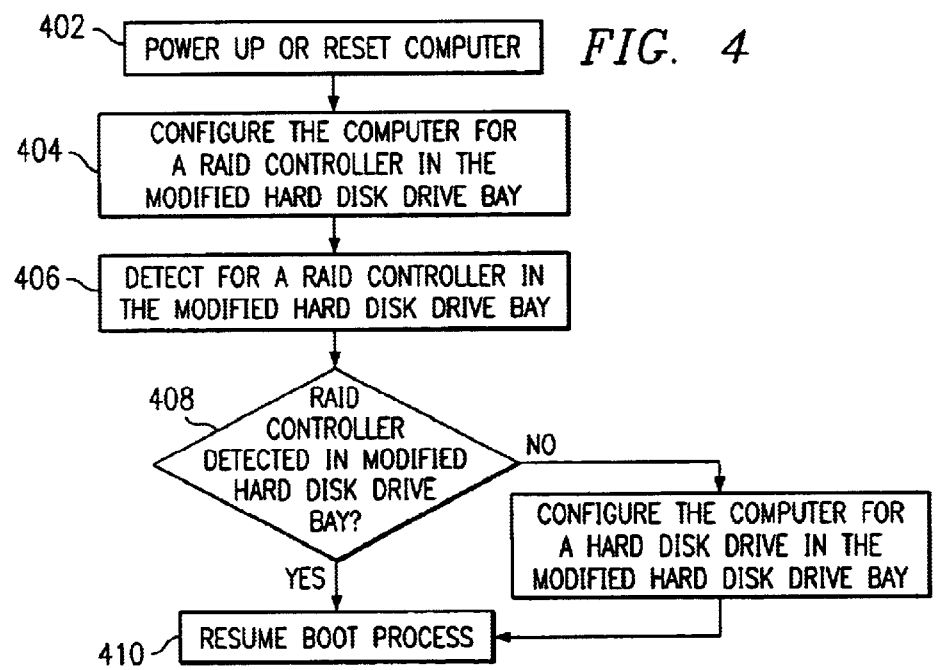
FIG. 4 depicts a flow diagram for configuring a computer system for the device installed in the modified hard disk drive bay.

FIG. 4 depicts a flow diagram for configuring a computer system for the device installed in modified hard disk drive bay 106a. In step 402, a user powers up or resets the computer system. When the computer system receives power, in step 404 motherboard 104 configures the computer system as if RAID controller 206 is installed in modified hard disk drive bay 106a. Configuring the computer system as if RAID controller is installed in modified hard disk drive bay 106a includes redefining pin connectors 107 and node port 114a. In addition, motherboard 104 establishes control loop 208.

In step 406, motherboard 104 detects or looks for a RAID controller installed in modified hard disk drive bay 106a. If RAID controller 206 is installed in modified hard disk drive bay 106a and therefore detected by motherboard 104 in step 408, then the boot process resumes in step 410. But if motherboard 104 detects no device in modified hard disk drive bay 106a or detects hard disk drive 110a in modified hard disk drive bay 106a, then motherboard 104 configures the computer system as if a hard disk drive is in modified hard disk drive bay 106a. Therefore there is no RAID functionality and loop controller 102 controls the operation of any internal hard disk drives present with one loop 116.

Although the disclosed embodiments have been described in detail, in another embodiment of the present disclosure dual RAID controllers can be installed in a hard disk drive bay taking advantage of the dual loop capability of the standard fibre channel hard disk drive pin connectors. In another embodiment of the present disclosure, dual RAID controllers can be installed in two hard disk drive bays with one RAID controller controlling one storage loop and the second RAID controller controlling a second, redundant storage loop. In another embodiment of the present disclosure, a RAID controller can be installed in a hard disk drive bay connecting to a second connector in the bay separate from the connector used by the hard disk drive. In another embodiment of the present disclosure, the dual RAID controllers can be installed in a hard disk drive bay connecting to a second connector in the bay separate from the connector used by the disk drive. In another embodiment of the present disclosure, dual RAID controllers can be installed in two hard disk drive bays with one controller controlling one storage loop and the second RAID controller controlling a second, redundant storage loop with the RAID controller attaching to second connectors in their respective hard disk drive bays separate from the connector used by the hard disk drives.

Although the disclosed embodiments have been described in detail, it should be understood that various changes, substitutions and alterations can be made to the embodiments without departing from their spirit and scope.

What is claimed is:

1. A computer system capable of accepting an internal RAID controller, the computer system comprising:
   a loop controller operable to control data transfer;
   a plurality of hard disk drives associated with the loop controller, the hard disk drives operable to store data;
   a plurality of hard disk drive bays associated with the hard disk drives, the hard disk drive bays operable to receive the hard disk drives;
   a modified hard disk drive bay associated with the loop controller, the modified hard disk drive bay operable to receive either the RAID controller or a hard disk drive; and
   a loop associated with the loop controller and the hard disk drive bays, the loop operable to provide an interface between the loop controller and the hard disk drives.

2. The computer system of claim 1 wherein the loop comprises fibre channel.

3. The computer system of claim 2 further comprising a plurality of link resiliency circuits associated with the loop, the link resiliency circuits operable to control detection of the presence of a hard disk drive or RAID controller and to switch the hard disk drive or RAID controller into the loop.

4. The computer system of claim 2 wherein the loop controller comprises a motherboard embedded fibre channel controller.

5. The computer system of claim 1 wherein the modified hard disk drive bay receives the RAID controller.

6. The computer system of claim 1 wherein the modified hard disk drive bay receives a hard disk drive.

7. The computer system of claim 1 wherein the loop comprises an ATA interface.

8. The computer system of claim 1 wherein the loop comprises a USB interface.

9. A computer system comprising:
   a loop controller operable to control data transfer;
   a RAID controller interfaced with the loop controller, the RAID controller operable to control data storage;
   a plurality of hard disk drives associated with the RAID controller, the hard disk drives operable to store data;
   a plurality of hard disk drive bays associated with the RAID controller and the hard disk drives, the hard disk drive bays operable to receive the hard disk drives;
   a modified hard disk drive bay associated with the RAID controller, the modified hard disk drive bay operable to receive either the RAID controller or a hard disk drive;
   a control loop associated with the RAID controller and the loop controller, the control loop operable to provide an interface between the RAID controller and the loop controller; and
   a storage loop associated with the RAID controller and the hard disk drive bays, the storage loop operable to provide an interface between the RAID controller and the hard disk drive bays.

10. The computer system of claim 9 wherein the control loop and the storage loop comprise fibre channel.

11. The computer system of claim 10 further comprising a plurality of link resiliency circuits associated with the control loop and the storage loop, the link resiliency circuits operable to control detection of the presence of a hard disk drive or RAID controller and to switch the hard disk drive or RAID controller into the control loop or the storage loop.

12. The computer system of claim 10 wherein the loop controller comprises a motherboard embedded fibre channel controller.

13. The computer system of claim 9 wherein the control loop and the storage loop comprise an Infiniband interface.

14. The computer system of claim 9 wherein the control loop and the storage loop comprise an Ethernet interface.

15. The computer system of claim 9 wherein the control loop and the storage loop comprise a parallel SCSI interface.

16. The computer system of claim 9 wherein the modified hard disk drive bay receives the RAID controller.

17. The computer system of claim 9 further comprising an access port associated with the RAID controller and separate from the modified hard disk drive bay, the access port operable to allow for communication between the loop controller and the RAID controller.

18. The computer system of claim 9 further comprising a plurality of external hard disk drives resident in a just a bunch of disks enclosure associated with the RAID controller and the storage loop, the external hard drives operable to store data.

19. The computer system of claim 18 wherein the RAID controller controls the storage of data within the hard disk drives and the external hard disk drives.

20. A method for adding an internal RAID controller, the method comprising:

splitting an interface loop into a control loop and a storage loop;

redefining pin connectors of a port for a modified hard disk drive bay to accommodate two loops; and installing the RAID controller in the modified hard disk drive bay.

21. The method of claim 20 wherein installing the RAID controller comprises configuring the RAID controller with a plurality of hard disk drives to create a RAID array.

22. The method of claim 20 further comprising:

connecting the control loop to the RAID controller and a loop controller; and connecting the storage loop to the RAID controller and a plurality of hard disk drives.

23. The method of claim 20 wherein splitting the interface loop comprises dividing a fibre channel interface loop into a control loop and a storage loop.

24. The method of claim 20 wherein splitting the interface loop comprises dividing an Infiniband interface loop into a control loop and a storage loop.

* * * * *